March 17, 1959 C. B. BRAHM 2,877,854
SYNCHROPHASER RESETTING MECHANISM FOR VARIABLE
PITCH AIRCRAFT PROPELLERS
Filed Dec. 27, 1955 2 Sheets-Sheet 2

INVENTOR
CHARLES B. BRAHM
BY Harris G. Luther
ATTORNEY

United States Patent Office 2,877,854
Patented Mar. 17, 1959

2,877,854

SYNCHROPHASER RESETTING MECHANISM FOR VARIABLE PITCH AIRCRAFT PROPELLERS

Charles B. Brahm, Windsor Locks, Conn., assignor to United Aircraft Corporation, East Hartford, Conn., a corporation of Delaware Application December 27, 1955, Serial No. 555,596

18 Claims. (Cl. 170—135.29)

This invention relates to phasing mechanism for two or more devices and particularly to phasing mechanism for maintaining two or more rotating aircraft propellers substantially in a selected phase relation.

An object of this invention is mechanism for limiting the extent of change of the slave governor by the master device and means for temporarily disabling control by the master and recentering the slave governor control.

A further object is mechanism for electrically returning a control motor to a central position upon disabling of its control signal.

A still further object is means for recentering a portion of a control mechanism while holding the controlled device in a substantially fixed position.

Another object is mechanism for electrically returning a governor speed setting control motor to a central position while holding the governor speed setting substantially fixed and then again connecting the centered control motor with the governor speed setting mechanism.

Further and other objects will be apparent from the following specification and the attached drawings in which:

Fig. 3 is a diagram showing the stop for the governor control.

In the operation of multi-engine aircraft it has been found desirable both from a vibration and a noise standpoint to not only synchronize the several engine-driven propellers but to also maintain a selected phase relation between the propellers. Mechanism responsive to speed alone is not capable of maintaining the required phase relation even when such mechanism is capable of maintaining speed synchronization.

Applicant has invented an improved device which may be used to control the speed of each propeller independently with the synchrophasing mechanism disconnected or may be able to synchronize the several propellers, selecting one as a master and the others as slaves synchronized with the master and maintain a selected phase relation between the master and slave within comparatively small limits with the synchrophasing mechanism connected. The type of propeller which has been chosen to explain the synchrophaser mechanism is the type similar to that shown in Jedrziewski Patents Nos. 2,704,583, issued March 22, 1955, and 2,636,566, issued April 28, 1953. In this propeller type, which is now well known in the art, a hydraulically actuated piston mounted in a dome on the forward part of the propeller is actuated by hydraulic fluid controlled by a flyball governor similar to that shown in Patent No. 2,636,566 to change the propeller pitch. The speed setting of the governor is obtained by adjusting the position of one end of the speeder spring of the governor. In the present embodiment, the spring is adjusted by an electric motor in a manner similar to that described in Martin Patent 2,252,518, issued August 12, 1941, by a step-motor and control similar to that shown in Drake Patent No. 2,327,341, issued August 24, 1943. Reference may be made to the above mentioned patents for further details of the propeller, the propeller governor, and governor spring setting means. As this mechanism is generally well known, it is believed that further explanation will not be necessary for a complete understanding of the present invention.

As shown in the Drake patent, the governor setting motor of the present application is a step-motor controlled by a commutator switch. The step-motor will turn in one direction or the other depending upon the direction of rotation of the commutator switch or the polarity applied to the commutator switch.

In the present embodiment, the commutator switch in each of the slave devices is driven by a two-phase motor which is controlled by the electronic synchronizing and phasing mechanism which compares the speed and phase of the master and slave devices. The commutator switch for the master motor is driven by a manually controlled D. C. motor so that the master motor governor may be set at any desired speed setting.

Figure 1:
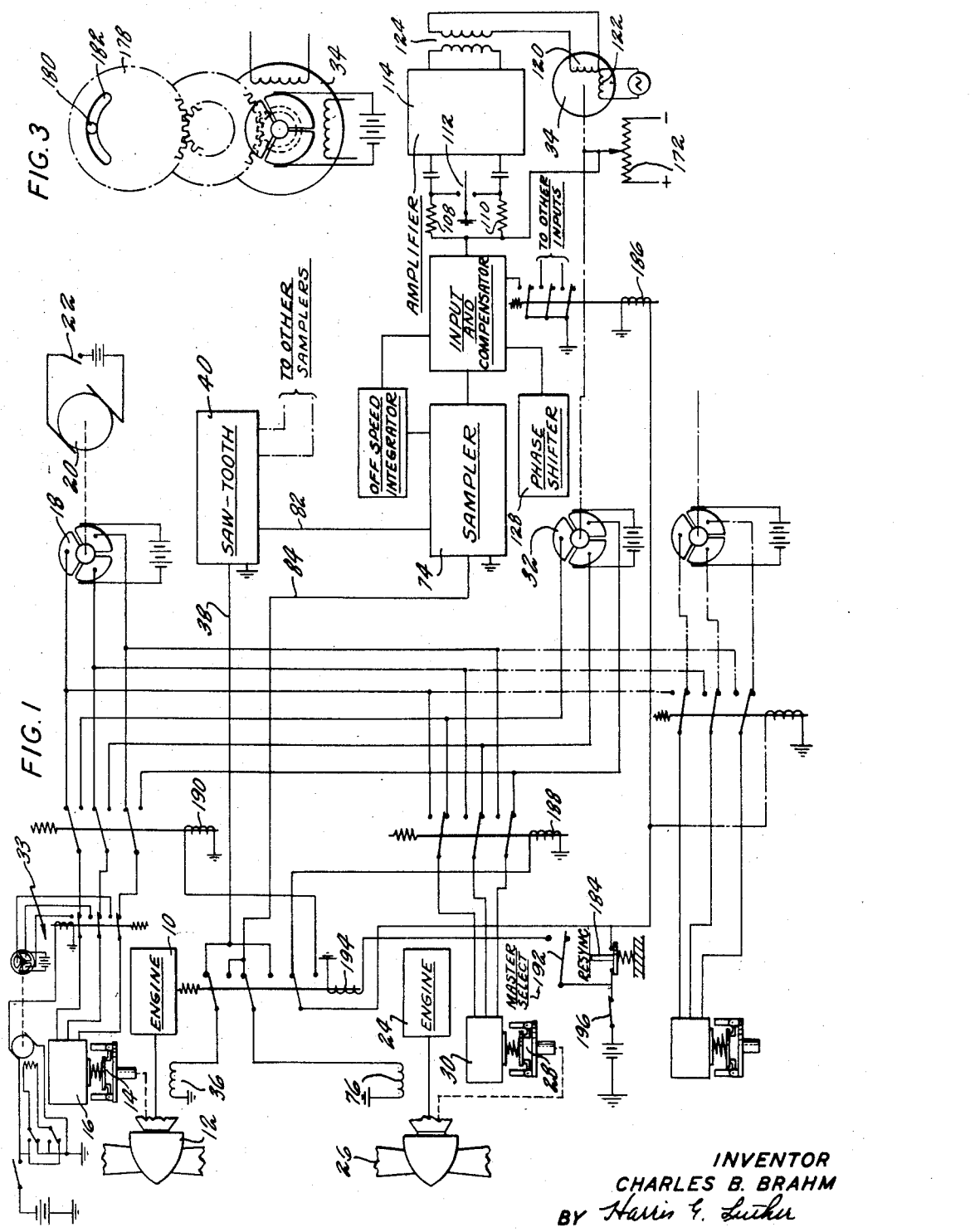
Fig. 1 is a block diagram showing one master unit and one slave unit and means for interchanging the master and slave and also indicating how additional slaves may be added.

Provision is also made for substituting manually controlled commutator switches, shown generally at 33, Fig. 1, for the master or slave commutator switches so as to manually control any one or all of the several rotating devices at will.

The syncronizing and phasing mechanism comprises individual means producing a pulse in timed relation to the rotation of the respective device and mechanism converting the pulse from the master into a saw-tooth wave timed with said pulse. The saw-tooth wave is sampled by the pulse from the slave and a signal proportional to the value of the saw-tooth at the instant of sampling is produced. The value of the signal indicates the phase relation between the master and the slave, a zero signal indicating an in-phase relation. If the slave and master are operating at different speeds, an additional off-speed signal may be produced. The off-phase and off-speed signals are combined, chopped, amplified and fed to a two-phase motor which drives the commutator switch of the slave to return the slave to synchronism and phase.

It has been found that the electronic control can control the governor speed setting accurately enough so as to maintain the phase relation of two or more devices, such as master and slave devices, to within a very small range such as 10 degrees by controlling the speeder springs of the various governors with the speed and phase sensitive electronic control hereinafter described.

As shown in Fig. 1, a master engine 10 drives a propeller 12 whose pitch is controlled by a governor 14 having a step-motor 16 for adjusting the setting of the speeder spring of the governor. The step-motor 16 is motivated by rotation of commutator switch 18 rotated by a D. C. motor 20 controlled by a switch 22 so as to set the master governor speed when engine 10 and propeller 12 are utilized as the master.

Slave engine 24 drives propeller 26. The pitch of propeller 26 is controlled by a flyball governor 28 whose speeder spring may be set by the step-motor 30 controlled by a commutator switch 32 rotated by a two-phase motor 34 which is controlled by the electronic synchronizing and phasing mechanism described hereinafter so as to adjust the speeder spring of governor 28 to maintain the engine and propeller 24, 26 in synchronism and in phase with the master engine and propeller 10, 12.

Switching mechanism which will be described hereinafter is provided for interchanging controls so as to optionally utilize engine 24 as the master and engine 10 as a slave. Switching mechanism 33 is also provided for manually operating any of the governor setting mechanisms. Although only one system 33 for substituting manually controlled commutator switches has been shown, it will be understood that each slave and the master will generally be provided with such a system. The additional systems have been omitted for the sake of drawing simplicity.

The synchrophasing mechanism comprises a pulse generator for each device, two of which generators, 36 and 76, are shown in Fig. 1. Each pulse generator is similar to that shown in an application Serial Number 555,595 of Stanley G. Best for Synchronizer filed on even date herewith to which reference may be made for a more detailed description. It should be sufficient here to state that this pulse generator comprises a permanent magnet and a coil which are moved relative to each other by the propeller and once each revolution pass in close proximity so as to create a pulse having a positive going portion in the coil.

Figure 2:
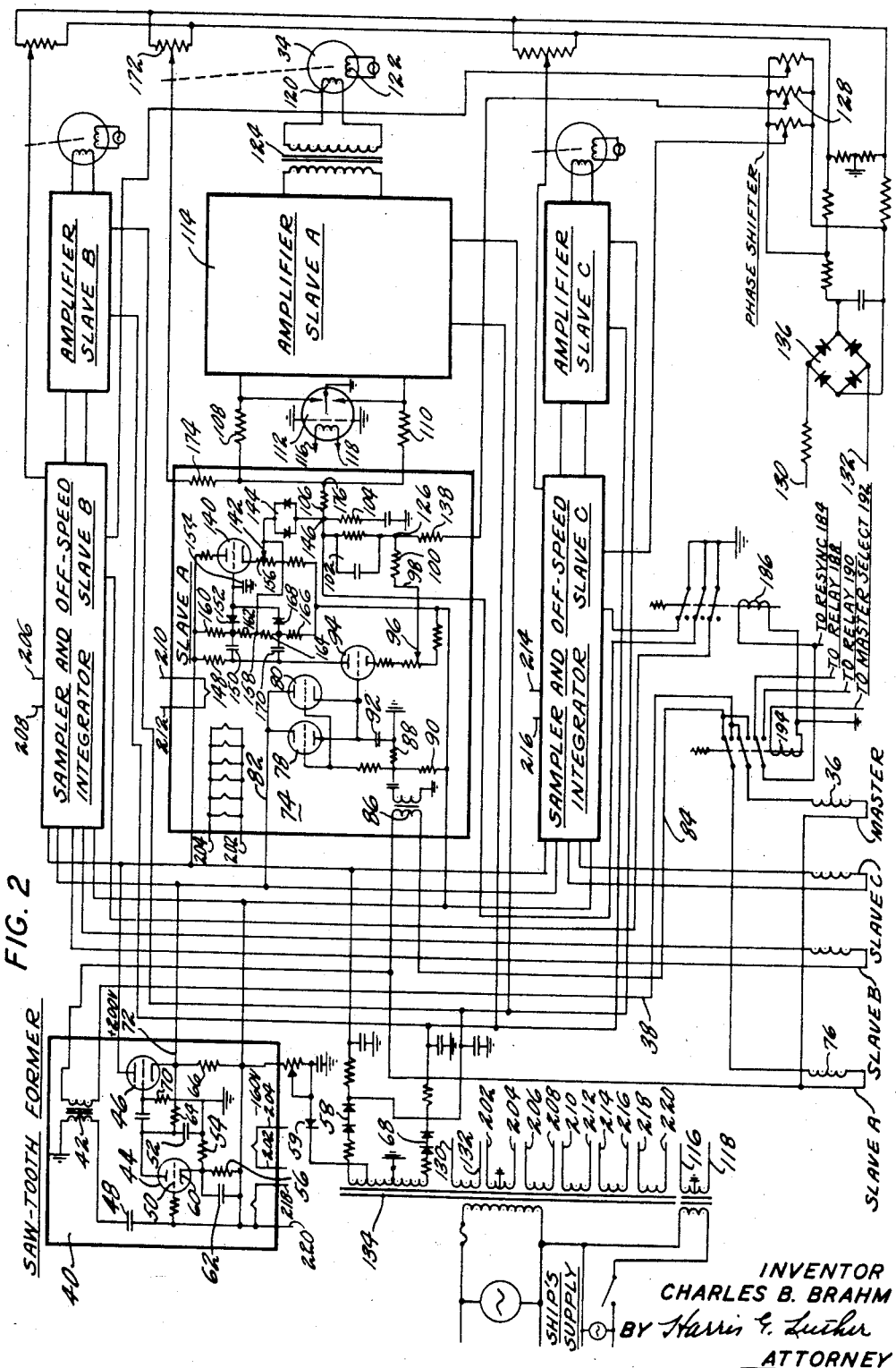
Fig. 2 is a schematic wiring diagram of the synchronizer and phasing portion of the electronic control schematically showing three slaves and showing one sampler in detail and how it is connected to the two-phase motor.

The free end of the coil of pulse generator 36 is grounded or connected to a common return line and the other end is led through a line 38 to a saw-tooth former 40 and there the pulse is transformed into a saw-tooth voltage wave. As shown in Fig. 2, saw-tooth former 40 has a transformer 42 which steps-up the voltage of the pulse. The amplified pulses are then led through the electronic circuits including a tube 44 and a tube 46 where they are transformed into a linear saw-tooth wave. The saw-tooth wave is formed in a manner similar to that explained in the Offner Patent No. 2,517,703 and in the above-identified application of Stanley Best for Synchronizer, application Serial Number 555,595, filed on even date herewith, so that the following brief explanation of the saw-tooth former structure here is believed all that will be necessary to understand the present invention. The pulse developed by the master engine pulse generator 36 is coupled via condenser 48 to the signal grid 50 of the cathode-follower tube 44. When the pulse causes the bias on grid 50 to be less than cut-off, tube 44 will conduct and negatively charge condenser 52 close to the negative cathode potential of the tube 44. Resistors 54 and 56, forming a voltage divider from the negative voltage, say minus 160 volts, of rectifier 59, place a negative voltage on the cathode 60, which is normally slightly positive with respect to the grid 50 so that tube 44 is normally non-conducting. Capacitor 62 serves as a by-pass to prevent any rapid change in cathode current appearing as a bias on the tube. Condenser 52 is discharged to a less negative voltage through resistors 64 and tube 46.

Resistor 66 is a cathode resistor of tube 46 which is a cathode-follower type of tube having a plate voltage of say plus 200 volts supplied by the rectifier 58. As the grid of tube 46 is grounded through grid resistor 70, the average grid voltage is zero with respect to ground so that the average current through tube 46 is constant and hence the average voltage appearing at the junction of resistors 64 and 66 has some average value between minus 160 volts and plus 200 volts, say around zero volts with respect to ground. Hence, condenser 52 will charge to some negative value of say 140 volts when tube 44 conducts, and will be discarded slowly through resistors 64 and tube 46 to a fixed amount less than the voltage at their junction with resistor 66, say 70 volts less, during the period when tube 44 is not conducting. This will produce a voltage across the condenser 52 which will be of the desired saw-tooth form. As explained in more detail in the Offner patent and the above mentioned application, the saw-tooth curve will be a linear curve and will not vary materially with frequency. Due to the cathode follower action and the variation of the grid voltage of tube 46 with variation in the charge on condenser 52, a linear saw-tooth wave, varying both sides of zero voltage, is produced at the junction of resistors 64 and 66.

The linear saw-tooth voltage from the saw-tooth former 40 is led on line 72 to a sampler 74 where it is sampled by a pulse from pulse generator 76 of propeller 26 to give a proper signal to the two-phase motor 34 to adjust the governor of the propeller 26 in accordance with the speed and position of the propeller 12. Sampler 74, as shown in Fig. 2, has a circuit comprising tubes 78 and 80 having the cathode of the tube 78 and the plate of tube 80 connected to the saw-tooth input by line 82. The pulse from the pulse generator 76 of the slave engine is fed in on line 84 to a transformer 86 and thence to the grid of both tubes 78 and 80. A negative bias with respect to ground is normally maintained on both grids by the resistors 88 and 90 forming a voltage divider and connected to the minus 160 volt line. The positive going portion of the pulse from generator 76 applied to the grids of tubes 78 and 80 will cause one of the tubes 78, 80 to conduct and charge condenser 92 and thus sample the saw-tooth voltage and place a resultant signal on the grid of tube 94 which will indicate the direction and extent of out-of-phase of the master with respect to the slave. The fixed grid bias on the grid of tubes 78 and 80 is so adjusted that no anode current can flow through either tube, except when the positive going pulse is applied to the grids from the slave pulse generator.

If at the time the positive going pulse is applied to the grids of 78 and 80 the saw-tooth wave from the master applied to tubes 78 and 80 is positive or more positive than the charge on condenser 92, then tube 80 will conduct and charge condenser 92 to a more positive value. If at the sampling instant the condenser were more positive or less negative than the saw-tooth wave from the master, then tube 78 will conduct and reduce the charge on the condenser. Thus a phase difference voltage wave will be developed across an energy storage device such as condenser 92 which will have a polarity and magnitude indicating the magnitude and direction of any out-of-phase relation between the master and the slave. No significant current will flow from the condenser 92 to the grid of tube 94.

Tube 94 being a cathode follower type will, at the contact of potentiometer 96, give an indication in line 98 of the out-of-phase condition. With no grid signal, i. e., zero voltage with respect to ground, on tube 94, a zero voltage will be obtained in the potentiometer 96. The wiper arm will be set so as to give this zero voltage for the on-phase condition. When the slave propeller is leading, the slave pulse will sample a negative portion of the saw-tooth to give a negative voltage on the grid of tube 94 and cause the voltage detected by the potentiometer 96 to become negative. The voltage from the potentiometer 96 is led through a resistor 100, and a lead network 102 to a lag network 104 and a resistor 106. Resistor 106 is connected through resistors 108 and 110 to a chopper 112 and an amplifier 114. The chopper 112 is energized from the ship's supply, which may be a 400 cycle 115 volt supply through transformer terminals 116 and 118. The amplifier is a push-pull amplifier which will amplify the 400 cycle square wave produced by the chopper 120 and transmit it to the control winding 120 of the two-phase motor 34 used to actuate the commutator switch 32 and adjust the propeller pitch. The reference winding 122 of the two-phase motor 34 is energized directly from the 400 cycle ship's supply.

The chopper 112 has a mechanical lag which will provide the input signal supplied to amplifier 114 with a 70 degree lag with respect to the supply voltage. The transformer 124 may be tuned to provide additional lag so that the control voltage supplied to the winding of the two-phase motor 34 will have about a 90 degree lag behind the reference voltage supply to the winding 122 which will cause the motor 34 to rotate in one direction.

Upon a change in polarity of the D. C. voltage supplied to the chopper 112 and the amplifier 114, the control voltage in winding 120 will have about a 90 degree lead over the reference voltage in winding 122 and will cause the motor 34 to rotate in the opposite direction. Thus, the governor setting of the slave may be changed to increase the slave propeller speed if the slave is lagging, and decrease the slave propeller speed if the slave is leading to thereby bring the slave propeller back into phase with the master.

If it is desired to change the phase relation of the master and slave so as to cause the slave to lead or lag the master by a given amount, the signal from the phase output 96 is modified by a signal applied at junction 126. This signal is supplied from a manually actuated phase control potentiometer 128 having its own power supply from terminals 130 and 132 of power transformer 134 and its own rectifier 136. Thus, if the phase output 96 is providing a negative signal at the junction 126 due to a phase lead of the slave and a positive signal is supplied from potentiometer 128 through resistor 138 to the junction 126 which will result in a zero voltage at that junction, no signal will be supplied to change the slave governor setting and the slave will continue to operate in this phase lead position and the synchrophaser will work in its normal manner to maintain this relationship.

In a manner more fully described in the above identified application to which reference may be made for a more detailed description, if the relative position of the propellers were to change by more than 180 degrees from the zero-signal, in-phase position, an erroneous signal would be obtained. For instance, if the slave were running faster than the master, the off-phase signal would be negative as the slave increased its leading position tending to reduce the slave speed until just after the end or bottom of the saw-tooth wave was sampled, at which time the sampled portion of the saw-tooth would change polarity and be positive and the off-phase signal would also be positive. Although the slave would still be running faster than the master, it would in effect have a lagging position with respect to the master and thus give an off-phase signal in the opposite direction from that in which the correction should be made. In order to solve this problem, an off-speed integrator is supplied which will count the number of revolutions of off-phase as they are passed and produce a signal of the correct polarity proportional to that number, which signal is added to the off-phase signal and applied to the amplifier to give a speed correction in the proper direction. The off-speed integrator utilizes the sudden voltage change in the sampled saw-tooth wave voltage to produce a pulse in the plate circuit of tube 94 and energizes cathode follower tube 140 to produce an off-speed signal at the wiper of potentiometer 142. The voltage from wiper 142 is led through a limiter 144 and combined at junction 146 with the off-phase voltage signal.

In this off-speed integrator, if a condenser is charged every time the abrupt change in the sampled saw-tooth voltage occurs and the charge did not materially leak off the condenser between changes, the voltage across the condenser would indicate the number of times and the direction the relative phase had gone through 180 degrees. If the phase were changing in one direction, i. e., the slave underspeeding, the charge on this condenser would continually be going positive to effect an increase in speed. If the phase were changing in the other direction, i. e., the slave overspeeding, the voltage across this condenser would continually be going negative to decrease the speed. When this voltage is added to the off-phase signal, the effective range of synchrophasing is thus extended beyond the 180 degrees relation.

The signal for the grid of tube 140 is obtained by placing a resistance 148 in the plate circuit of tube 94. For an overspeed of the slave, there would be a voltage change in the negative direction across resistance 148 caused by the positive going pulse on the grid of tube 94 induced by the abrupt positive going change in the saw-tooth voltage. The negative voltage change across resistance 148 is coupled through condenser 150 and rectifier 152 charging condenser 154 to some more negative value than it had previously achieved. This more negative value is applied to the grid of tube 140. Each pulse charging condenser 154 is additive until a maximum is reached, and thus each additional charge drives the grid of tube 140 more negative to decrease the current in cathode resistor 156 and decrease the voltage at junction 146. The potential at the wiper 142, due to the cathode follower action, will be almost that existing across condenser 154. This negative cathode voltage is applied to the junction 158, thus tending to maintain the charge on condenser 154. Resistors 160, 162, 164, and 166 serve to bias rectifiers 152 and 168 so that no conduction will occur in tube 140, except when a material change in voltage occurs at the plate of tube 94. The sizes of the condensers 150 and 170 are such and the contact potential of rectifiers 152 and 168 are such that an abrupt material change in voltage is required to make the rectifiers conduct. Thus, a slow change in phase between +180 and −180 will not charge condenser 154, but when the phase circuit goes through the 180° mark an abrupt and material change will occur and charge condenser 154 to some new value.

The action for an underspeed condition of the slave is exactly the same, except that all polarities of signals are reversed and rectifier 168 conducts, biasing the grid of tube 150 more positively.

The convention used in this application, with respect to rectifiers, is that the arrows indicate current flow, as opposed to electron flow. The contact potential of the rectifier in limiter 144 is such that no conduction will occur for small changes in the cathode follower output at the wiper 142.

The lag network 104 serves as an integrator to obtain high static sensitivity by blocking the flow of D. C. signals to ground while stable control is still possible because of reduced dynamic sensitivity. The lead network 102 assists in dynamic stability by passing rapidly changing signals.

Each two-phase motor drives an individual potentiometer and, as shown in Fig. 2, two-phase motor 34 for example, there being similar motors for each slave, drives a potentiometer 172 which will feed a signal back through resistor 174 to junction 176, where it is combined with the off-phase and off-speed signals. The potentiometer 172 is provided with a voltage from the rectifier 136 and the power transformer 134. The output of the potentiometer ranges from negative to positive, depending upon its position.

As shown in Fig. 3, two-phase motor 34 taken as an example is connected through a gear reduction to a stop mechanism comprising a slotted gear 178. A fixed pin 180 rides in slot 182 and limits the extent of motion of the two-phase motor 34. As the two-phase motors, such as 34, drive the commutator switches to reset the mechanical governors, limiting the motion of the two-phase motors will limit the extent to which the governors may be reset. In a practical embodiment, this resetting of the governor by the phasing mechanism has been limited to approximately 3 percent of the governor speed so that upon failure of a master, the slave cannot be reset more than 3 percent by the phasing and synchronizing mechanism in attempting to follow the master.

The potentiometer 172 is connected with the two-phase motor 34 so as to give a zero voltage when the motor is in its central position; that is, when fixed pin 180 is in the midpoint of slot 182.

As to the two-phase motor 34 makes a correction in speed setting to compensate for an off-phase signal, the potentiometer 172 is actuated to oppose that off-phase signal. Resetting of the governor by the two-phase motor 34, working through the commutator switches, will also tend to reduce the off-phase signal by bringing the slave nearer into phase with the master and eventually the point is reached where the feedback signal is equal to or greater than the off-phase signal. When the feedback signal becomes greater than the off-phase signal, the two-phase motor will start operating in the opposite direction to reset the slave governor with the propeller continuing to correct toward the on-phase condition. With both the feedback signal and the off-phase signal decreasing, the two-phase motor will come to rest at its center position with the propeller on-phase and with a zero sampler or off-phase signal. It will be noted that the original setting is ultimately desired in the case where merely a phase correction is being made, because the engine speeds are already equal, and correction is necessary only temporarily until the slave is brought into phase, at which time the original speed setting is again desired in order to maintain the speed matching in the new phase relationship.

In the event of an off-speed condition which will require a resetting of the slave governor to change the slave speed to maintain synchronism with the master, the two-phase motor will finally come to rest off the center position wherever a balance is achieved between the potentiometer feedback and the off-phase or off-speed signal. If the original off-speed were small, the sleeve engine will have been brought into a phase leading or lagging position where the speed of the slave and the master are the same but the off-phase signal will be balanced by the potentiometer feedback due to an off-center position of the two-phase motor and with the slave governor set at a phase somewhat different than its manual setting. Under these conditions, the resynchronizing button 184, Fig. 1, may be actuated, or the phase control potentiometer may be set to accomplish the desired phase matching between master and slave. The resynchronizing button 184 supplies 28 volts D. C. to a relay 186 which, when de-energized, will connect junction 146 and similar junctions on each of the other channels with ground thus preventing any signal being fed to the amplifiers and the two-phase motors. The resynchronizing button 184, also supplies 28 volts to relay 188 or 190, depending upon the position of the master selector switch 192. As shown in Fig. 1, propeller 12 has been selected as the master so that relay 188 is controlled by resynchronizing button 184. De-energization of relay 188 will transfer control of the governor setting motor 30 to the master commutator switch 18 and thus hold the slave governor at the setting that it had at the time the resynchronizing button was actuated.

By grounding the junction 146 by relay 186, the signals from the potentiometer 172 alone, are fed back to the chopper 112 and the amplifier 114 to actuate the two-phase motor 34 and restore it to a central position where there will be no feedback from the potentiometer 172. The resynchronizing button 184 can then be released and the various slaves restored to control by their respective two-phase motors. As shown in dot-and-dash lines in Fig. 1, additional slaves besides the two shown in Fig. 1, may be controlled by the resynchronizing button 184. If the governor settings of the slave and the master are materially different, more than one actuation of the resynchronizing button may be necessary to bring the propellers into an on-phase position.

Master selection switch 192 controls relay 194 to interchange the connections of the pulse generators and the commutator switches of two of the devices to thereby change a slave to the master, and the master to a slave.

Opening of the main switch will place the control of all of the devices on the master commutator switch 18. Additional commutator switches actuated by manually controlled D. C. motors may be substituted at any time for either the master or slave commutator switches, as shown at 33 in Fig. 1. Although this manual control has been shown only in connection with the master motor, it is obvious that similar comutator switches may be connected to the individual step-motors in the governors and their synchronizing step-motors disconnected.

It is to be understood that the invention is not limited to the specific embodiment herein illustrated and described, but may be used in other ways without departure from its spirit as defined by the following claims.

I claim:

1. In a governor system for independently rotating devices, means producing an electrical signal indicating a difference in an operating characteristic between two of said devices, a motor operatively connected with one of said devices for adjusting the speed of said one of said devices to eliminate said difference, means directing said difference signal to said motor for controlling the operation of the same, said motor having a central position, means producing an off-center signal responsive to movement of said motor from said central position, and means, including means responsive to said off-center signal, for returning said motor to its central position and including means preventing adjustment of the speed of said one device relative to the other during said return.

2. In a governor system for independently rotating propellers having pitch adjusting means, means producing an electrical signal indicating a difference in speed between two of said propellers, a motor operatively connected with the pitch adjusting means of one of said propellers for adjusting the speed of said one of said propellers by changing the pitch of said one propeller to eliminate said difference, means directing said difference signal to said motor to control the operation of said motor and the pitch adjusting means of said one propeller, said motor having a central position, means producing an off-center signal responsive to movement of said motor from said central position, and means including means responsive to said off-center signal for returning said motor to its central position, and including means disconnecting said motor from the pitch changing means of said one propeller.

3. A device as claimed in claim 1 in which the operating characteristic is speed.

4. A device as claimed in claim 1 in which the operating characteristic is phase.

5. In a governor system for independently rotating devices in which each device has its own speed governor and means actuated by each governor for adjusting the speed of the respective device, means producing an electrical signal indicating a difference in an operating characteristic between two of said devices, a motor operatively connected with one of said governors for adjusting the speed setting of said one of said governors to eliminate said difference, means directing said difference signal to said motor to control the actuation of the same, said motor having a central position, means producing an off-center signal responsive to movement of said motor from said central position, and means including means responsive to said off-center signal for returning said motor to its central position said returning means including means preventing adjustment of said one governor relative to the other during said returning operation.

6. A system as claimed in claim 5 in which said preventing means includes means connecting both governors with the same adjusting means.

7. A system as claimed in claim 6 in which said other device has a motor for adjusting its speed and said same adjusting means is the adjusting motor for said other device.

8. A system as claimed in claim 1 including means limiting the movement of said motor from its central position to a preselected amount, to limit the effect without actuation of said returning means to approximately 3% of the speed of said one device.

9. In a governor system for independently rotating devices to be maintained in a selected relation, means actuated by an operating characteristic difference between two of the devices creating a difference signal, means creating from said difference signal a signal alternating voltage having approximately 90° phase displacement from a reference alternating voltage, a two phase motor connected with and energized by said alternating voltages, said motor having a central position and operatively connected with one of said devices for adjusting the speed of said one of said devices to eliminate said difference as it moves from said central position, means, responsive to movement of said motor from said central position, producing an off-center signal, connected with and opposing said difference signal, means disabling said signal alternating voltage and creating from said off-center signal a third alternating voltage having approximately 90° phase displacement from said reference voltage, means electrically connecting said third alternating voltage with said motor for returning said motor to the central position, and means preventing adjustment of the speed of said one device relative to the other during said return movement.

10. A governor system as claim in claim 9 in which the difference signal is a D.-C. signal, and said off-center signal is a D.-C. signal, and said signals are of opposing polarity and are combined and fed into an amplifying system to convert them to an A.-C. signal for operation of said two-phase motor.

11. A governor system for a plurality of independently rotating devices to be maintained in a selected phase relation, means producing an electrical signal indicating the phase difference between said devices, a motor operatively connected with one of said devices for adjusting the speed of said one of said devices, means directing said phase difference signal to said motor for controlling the operation of the same, said motor having a central position and means actuated by said motor producing an off-center signal proportional to the off-center position of said motor, means blocking said phase different signal from said motor and disabling the adjusting ability of said motor and means, including means responsive to said off-center signal connected with said motor for returning said motor to its central position.

12. A governor system for a plurality of independently rotating devices to be maintained in a selected phase relation, comprising an individual flyball governor for each device, a speeder spring for each governor, individual means for adjusting each said spring to select the speed setting of the respective governor, means actuated by each governor for controlling the speed of the respective device, a pulse generator for each device operatively connected with the respective device to produce a pulse in timed relation to the rotation of said respective device, means comparing the pulses of two of said devices and producing an electrical signal indicating the phase difference between said devices, a motor connected with said adjusting means, means directing said phase difference signal to said motor for controlling the operation of the same, said motor having a central position and means actuated by said motor producing an off-center signal proportional to the off-center position of said motor, means directing said off-center signal to said motor in opposition to said phase difference signal, means blocking said phase difference signal from said motor, and disconnecting said motor from said adjusting means and means, including means responsive to said off-center signal, for returning said motor to its central position.

13. A phasing system for a plurality of rotating devices including a master and a slave, each having means creating an electrical pulse in timed relation to the rotation of the respective device, electric means energized by said pulses due to a phase difference between said master and slave and creating a signal alternating voltage having approximately 90° phase displacement from a reference voltage, a two-phase motor energized by said alternating voltages, a governor controlling the speed of the slave device, means connecting said motor with said governor for changing the speed setting of said governor, means actuated by movement of said motor from a central position for creating a signal opposing the signal which created the movement, means for disabling said signal alternating voltage and utilizing said opposing signal to return said motor to its central position.

14. A system as claimed in claim 13 in which said electric means includes means producing a D.-C. signal responsive to said phase difference, and said means connecting said motor with said slave governor includes a commutator switch and a speed setting motor controlled by said switch, said system including a governor for said master and a master commutator switch and switch actuator and a speed setting motor actuated by said master switch for setting said master governor, said means creating said opposing signal producing a D.-C. signal of a polarity opposite to said phase difference D.-C. signal, means for combining said D.-C. signals and leading the resultant signal to an amplifying system transforming said resultant D.-C. signal to said signal alternating voltage, means disabling said phase difference signal and transforming said opposing D.-C. signal to an A.-C. signal to actuate said motor, and means disconnecting said slave governor setting motor from its commutator switch and connecting it with said master commutator switch during return of said motor to its central position.

15. A system as claimed in claim 5 including electrically actuated governor speed setting means for said one governor, a commutator switch driven by said motor electrically connected with said electrically actuated means for controlling the operation of said speed setting means, and causing the same to follow the direction and extent of operation of said switch.

16. A system as claimed in claim 15 including electrically actuated governor speed setting means for said other governor, a second motor, a second switch driven by said second motor, and means electrically connecting said second switch with said other governor to control the operation of said other governor speed setting means following the direction and extent of operation of said second switch.

17. A governor system as claimed in claim 2 including means limiting the movement of said motor from its central position to a preselected amount.

18. A system as claimed in claim 16 in which said preventing means includes means connecting both speed setting mechanisms with said second switch, and disconnecting said one governor switch from its speed setting mechanism.

References Cited in the file of this patent

UNITED STATES PATENTS

| | | |
|---|---|---|
| 2,431,687 | Drake | Dec. 2, 1947 |
| 2,482,812 | Treseder | Sept. 27, 1949 |
| 2,513,222 | Wilson | June 27, 1950 |
| 2,517,703 | Offner | Aug. 8, 1950 |
| 2,673,309 | Light et al. | Mar. 23, 1954 |
| 2,747,141 | Hine | May 22, 1956 |